(12) United States Patent
Oing et al.

(10) Patent No.: US 10,954,917 B2
(45) Date of Patent: Mar. 23, 2021

(54) SYSTEM AND METHOD FOR REDUCING WIND TURBINE LOADS BY YAWING THE NACELLE TO A PREDETERMINED POSITION BASED ON ROTOR IMBALANCE

(71) Applicant: General Electric Company, Schenectady, NY (US)

(72) Inventors: Hubert Oing, Kleinmachnow (DE); Robert Peter Slack, Seattle, WA (US); Darren John Danielsen, Simpsonville, SC (US); Santiago Tomas, Mollet del Valles (ES)

(73) Assignee: General Electric Company, Schenectady, NY (US)

(*) Notice: Subject to any disclaimer, the term of this patent is extended or adjusted under 35 U.S.C. 154(b) by 294 days.

(21) Appl. No.: 16/037,256

(22) Filed: Jul. 17, 2018

(65) Prior Publication Data
US 2020/0025170 A1 Jan. 23, 2020

(51) Int. Cl.
*F03D 7/02* (2006.01)
*F03D 17/00* (2016.01)
*F03D 7/04* (2006.01)

(52) U.S. Cl.
CPC .......... *F03D 7/0204* (2013.01); *F03D 7/042* (2013.01); *F03D 17/00* (2016.05); *F05B 2220/30* (2013.01); *F05B 2260/83* (2013.01); *F05B 2270/107* (2013.01); *F05B 2270/32* (2013.01); *F05B 2270/80* (2013.01)

(58) Field of Classification Search
CPC ...... F03D 7/0204; F03D 7/042; F03D 7/0296; F03D 7/0224; F03D 7/0264; F03D 7/0212; F03D 17/00
See application file for complete search history.

(56) References Cited

U.S. PATENT DOCUMENTS

| | | |
|---|---|---|
| 7,445,420 B2 | 11/2008 | Yoshida |
| 7,728,452 B2 | 6/2010 | Arinaga et al. |
| 8,100,628 B2 | 1/2012 | Frese et al. |
| 8,680,700 B2 | 3/2014 | Gomez De Las Heras Carbonell et al. |
| 8,749,084 B2 | 6/2014 | Gjerlov et al. |

(Continued)

FOREIGN PATENT DOCUMENTS

EP 3150850 A1 4/2017

OTHER PUBLICATIONS

U.S. Appl. No. 15/984,936, filed May 21, 2018.
European Search Report, dated Nov. 22, 2019.

*Primary Examiner* — David E Sosnowski
*Assistant Examiner* — Danielle M. Christensen
(74) *Attorney, Agent, or Firm* — Dority & Manning, P.A.

(57) ABSTRACT

A method for reducing loads of a wind turbine includes determining a wind speed at the wind turbine. Further, the method includes determining an operational state of the wind turbine. The method also includes determining whether a rotor of the wind turbine is imbalanced beyond a predetermined threshold when the operational state corresponds to a predetermined operational state as a rotor imbalance beyond the predetermined threshold is indicative of a pitch fault in one or more of the rotor blades. In addition, the method includes yawing a nacelle of the wind turbine to a predetermined angular position when the wind speed exceeds a predetermined speed threshold and the rotor is imbalanced beyond the predetermined threshold.

16 Claims, 5 Drawing Sheets

(56) References Cited

U.S. PATENT DOCUMENTS

| | | | |
|---|---|---|---|
| 9,371,819 B2 | 6/2016 | Grabau | |
| 9,416,771 B2 | 8/2016 | Obrecht et al. | |
| 2009/0066089 A1 | 3/2009 | Arinaga et al. | |
| 2009/0081041 A1* | 3/2009 | Frese | F03D 7/0268 |
| | | | 416/1 |
| 2011/0144949 A1* | 6/2011 | Siew | G06Q 10/06 |
| | | | 702/184 |
| 2015/0337802 A1 | 11/2015 | Su et al. | |
| 2019/0072082 A1* | 3/2019 | Lysgaard | G01P 5/26 |

* cited by examiner

SYSTEM AND METHOD FOR REDUCING WIND TURBINE LOADS BY YAWING THE NACELLE TO A PREDETERMINED POSITION BASED ON ROTOR IMBALANCE

FIELD

The present disclosure relates generally to wind turbines, and more particularly to systems and methods for reducing wind turbine loads by yawing the nacelle of the wind turbine to a predetermined benign yawing/azimuth position based on rotor imbalance.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor including one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation, the direction of the wind which powers the wind turbine may change. The wind turbine may thus adjust the nacelle through, for example, a yaw adjustment about a longitudinal axis of the tower to maintain alignment with the wind direction. In addition, when the wind turbine is parked or idling, conventional control strategies include actively tracking the wind direction to provide better alignment to the wind direction so as to minimize start-up delays when the wind speed increases or decreases back into the operating range.

However, in a situation where the wind turbine is idling and the rotor is imbalanced, there are limited benefits to tracking the wind as repair is needed before restarting the wind turbine. In addition, in such situations, the wind turbine can experience increased loads.

Accordingly, improved systems and methods for reducing loads during an idling or parked state of a wind turbine would be desired. In particular, the present disclosure is directed to systems and methods which actively yaw the nacelle of the wind turbine to a predetermined benign yawing/azimuth position when the wind turbine is idling or parked and the rotor is imbalanced so as to reduce loads during this scenario.

BRIEF DESCRIPTION

Aspects and advantages of the invention will be set forth in part in the following description, or may be obvious from the description, or may be learned through practice of the invention.

In one aspect, the present disclosure is directed to a method for reducing loads of a wind turbine. The wind turbine has a nacelle mounted atop a tower and a rotor mounted to the nacelle. The rotor includes a rotatable hub with a plurality of rotor blades mounted thereto. The method includes determining a wind speed at the wind turbine. Further, the method includes determining an operational state of the wind turbine. The method also includes determining whether the rotor is imbalanced beyond a predetermined threshold when the operational state corresponds to a predetermined operational state as a rotor imbalance beyond the predetermined threshold is indicative of a pitch fault (i.e. a stuck rotor blade) in one or more of the rotor blades. In addition, the method includes yawing the nacelle to a predetermined angular position (such as a loads benign yawing/azimuth position) when the wind speed exceeds a predetermined speed threshold and the rotor is imbalanced beyond the predetermined threshold.

In one embodiment, the step of determining the wind speed at the wind turbine may include receiving sensor signals from one or more wind sensors at the wind turbine and determining the wind speed as a function of the sensor signals.

In another embodiment, the predetermined operational state of the wind turbine may include an idling state, a parked state, a shutdown state, a reduced operation state, and/or a maintenance state.

In further embodiments, the step of determining whether the rotor is imbalanced beyond the predetermined threshold when the operational state corresponds to the predetermined operational state may include pitching each of the plurality of rotor blades of the wind turbine towards power to speed up a rotor speed of the rotor and determining whether the rotor of the wind turbine is imbalanced beyond the predetermined threshold based on the pitching.

In alternative embodiments, the step of determining whether the rotor is imbalanced beyond the predetermined threshold when the operational state corresponds to the predetermined operational state may include allowing the rotor to rotate passively and determining whether the rotor of the wind turbine is imbalanced beyond the predetermined threshold based on the passive rotation.

In still another embodiment, the step of determining whether the rotor is imbalanced beyond the predetermined threshold when the operational state corresponds to the predetermined operational state may include receiving, via the controller, one or more sensor measurements from one or more sensors, the one or more sensor measurements indicative of a rotor imbalance and determining, via the controller, whether the rotor is imbalanced beyond the predetermined threshold based on one or more sensor measurements that are used as inputs to a computer model. In such embodiments, the one or more sensors may include a proximity sensor, an inductive sensor, a strain gauge, a radio sensor, a laser sensor, a deflection measuring sensor, a Miniature Inertial Measurement Unit (MIMU), a pressure sensor, a load sensor, an accelerometer, a Sonic Detection and Ranging (SODAR) sensor, a Light Detection and Ranging (LIDAR) sensor, an optical sensor, or similar, or combinations thereof.

In additional embodiments, the method may include scheduling a maintenance action after yawing the nacelle to the predetermined angular position.

In several embodiments, the method may include continuously monitoring the incoming wind direction and yaw the nacelle to the predetermined angular position if the wind speed is below the predetermined speed threshold.

In certain embodiments, the method may include automatically yawing the nacelle of the wind turbine to the predetermined angular position. Alternatively, the method may include manually yawing the nacelle of the wind turbine to the predetermined angular position.

In another aspect, the present disclosure is directed to a system for reducing loads of a wind turbine. The wind turbine has a nacelle mounted atop a tower and a rotor mounted to the nacelle. The rotor includes a rotatable hub with a plurality of rotor blades mounted thereto. The system includes a controller having at least one processor configured to perform one or more operations, including but not limited to determining whether the rotor is imbalanced beyond a predetermined threshold, if the rotor is imbalanced beyond the predetermined threshold, determining an operational state of the wind turbine, and yawing the nacelle to a predetermined angular position when the operational state corresponds to a predetermined operational state and the rotor is imbalanced beyond the predetermined threshold. It should also be understood that the system may further include any of the additional features as described herein.

In yet another aspect, the present disclosure is directed to a method for reducing loads of a wind turbine while the wind turbine is idling. The wind turbine has a nacelle mounted atop a tower and a rotor mounted to the nacelle. The rotor includes a rotatable hub with a plurality of rotor blades mounted thereto. The method includes monitoring a wind speed at the wind turbine. Further, the method includes determining whether the rotor is imbalanced beyond the predetermined threshold while the wind turbine is idling. In addition, the method includes yawing the nacelle to a predetermined angular position when the wind speed exceeds a predetermined speed threshold and the rotor is imbalanced beyond the predetermined threshold. It should also be understood that the method may further include any of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
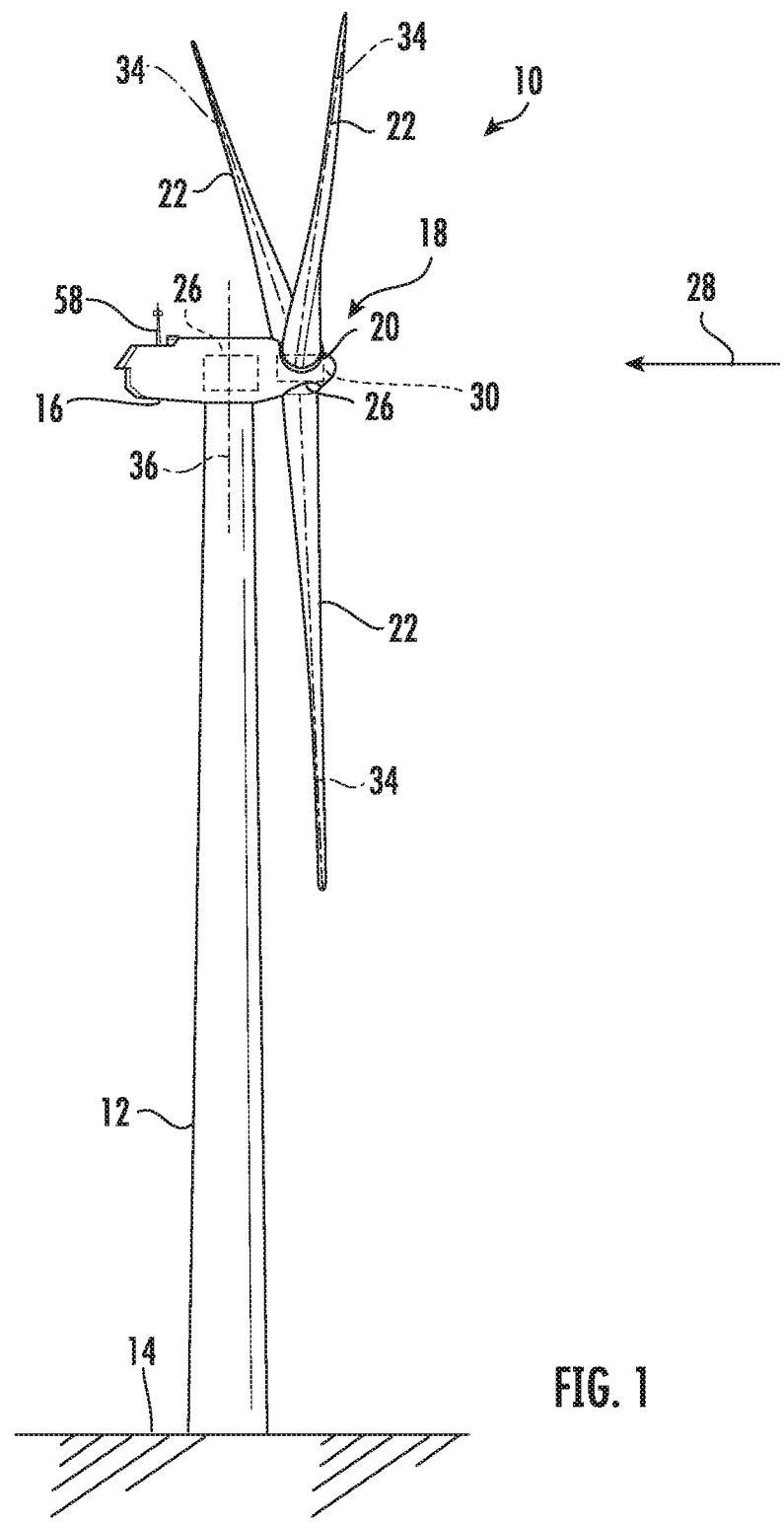
FIG. 1 illustrates a perspective view of a wind turbine according to one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
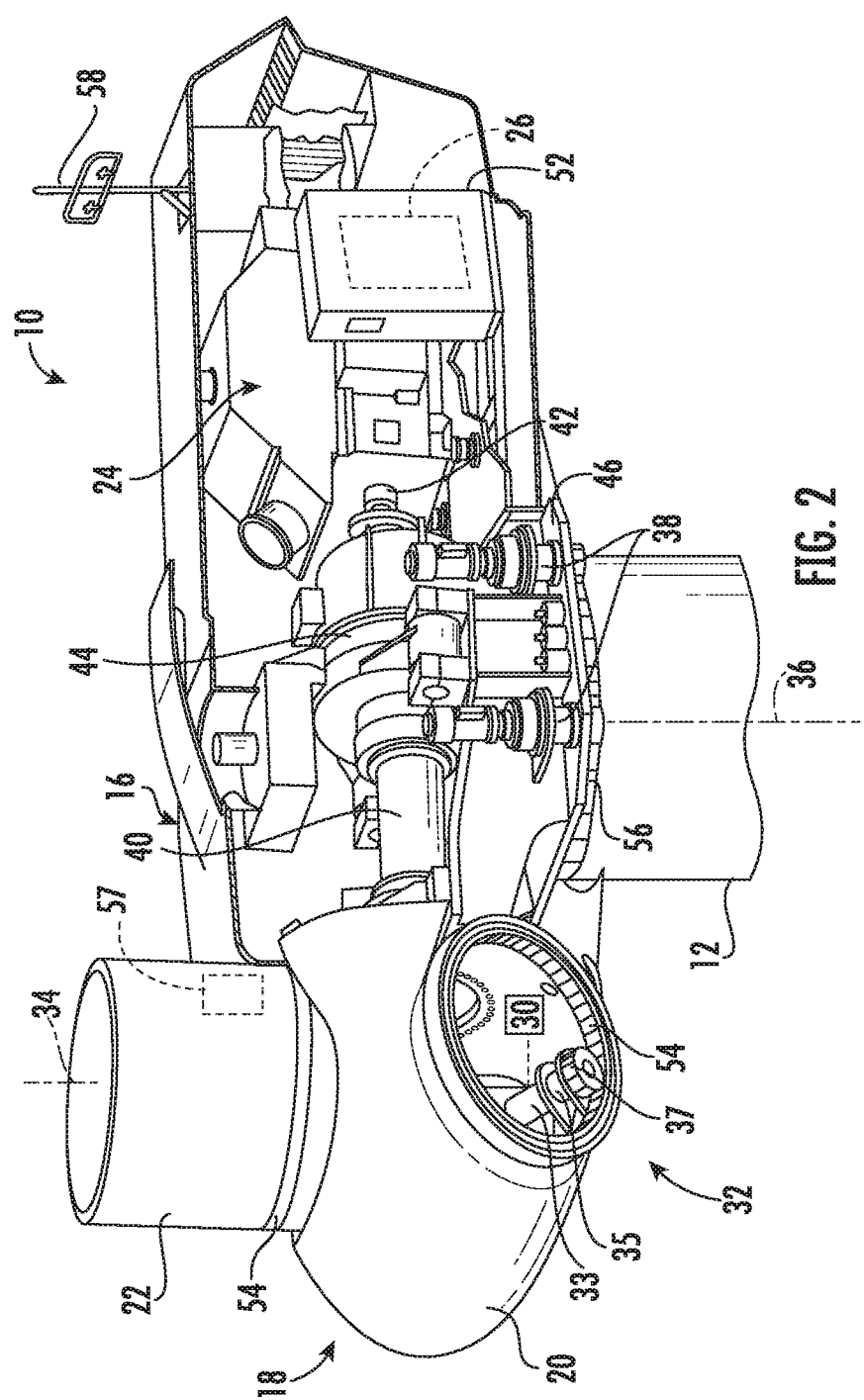
FIG. 2 illustrates a perspective, internal view of a nacelle of a wind turbine according to one embodiment of the present disclosure.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main shaft 40 coupled to the hub 20 for rotation therewith. The generator 24 may then be coupled to the main shaft 40 such that rotation of the main shaft 40 drives the generator 24. For instance, in the illustrated embodiment, the generator 24 includes a generator shaft 42 rotatably coupled to the main shaft 40 through a gearbox 44. However, in other embodiments, it should be appreciated that the generator shaft 42 may be rotatably coupled directly to the main shaft 40. Alternatively, the generator 24 may be directly rotatably coupled to the main shaft 40.

It should be appreciated that the main shaft 40 may generally be supported within the nacelle 16 by a support frame or bedplate 46 positioned atop the wind turbine tower 12. For example, the main shaft 40 may be supported by the bedplate 46 via a pair of pillow blocks 48, 50 mounted to the bedplate 46.

As shown in FIGS. 1 and 2, the wind turbine 10 may also include a turbine control system or a turbine controller 26 within the nacelle 16. For example, as shown in FIG. 2, the turbine controller 26 is disposed within a control cabinet 52 mounted to a portion of the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10.

In addition, as shown in FIG. 2, one or more sensors 57, 58 may be provided on the wind turbine 10. More specifically, as shown, a blade sensor 57 may be configured with one or more of the rotor blades 22 to monitor the rotor blades 22. It should also be appreciated that, as used herein, the term "monitor" and variations thereof indicates that the various sensors of the wind turbine 10 may be configured to provide a direct measurement of the parameters being monitored or an indirect measurement of such parameters. Thus, the sensors described herein may, for example, be used to generate signals relating to the parameter being monitored, which can then be utilized by the controller 26 to determine the condition.

Further, as shown, a wind sensor 58 may be provided on the wind turbine 10. The wind sensor 58, which may for example be a wind vane, and anemometer, and LIDAR sensor, or another suitable sensor, may measure wind speed and direction. As such, the sensors 57, 58 may further be in communication with the controller 26, and may provide related information to the controller 26. For example, yawing of the wind turbine 10 may occur due to sensing of changes in the wind direction 28, in order to maintain alignment of the wind turbine 10 with the wind direction 28. In addition, yawing of the wind turbine 10 may occur due to sensing a stuck blade, which is described in more detail herein.

Further, the turbine controller 26 may also be communicatively coupled to various components of the wind turbine 10 for generally controlling the wind turbine 10 and/or such components. For example, the turbine controller 26 may be communicatively coupled to the yaw drive mechanism(s) 38 of the wind turbine 10 for controlling and/or altering the yaw direction of the nacelle 16 relative to the direction 28 (FIG. 1) of the wind. Further, as the direction 28 of the wind changes, the turbine controller 26 may be configured to control a yaw angle of the nacelle 16 about a yaw axis 36 to position the rotor blades 22 with respect to the direction 28 of the wind, thereby controlling the loads acting on the wind turbine 10. For example, the turbine controller 26 may be configured to transmit control signals/commands to a yaw drive mechanism 38 (FIG. 2) of the wind turbine 10, via a yaw controller or direct transmission, such that the nacelle 16 may be rotated about the yaw axis 36 via a yaw bearing 56.

Still referring to FIG. 2, each rotor blade 22 may also include a pitch adjustment mechanism 32 configured to rotate each rotor blade 22 about its pitch axis 34. Further, each pitch adjustment mechanism 32 may include a pitch drive motor 33 (e.g., any suitable electric, hydraulic, or pneumatic motor), a pitch drive gearbox 35, and a pitch drive pinion 37. In such embodiments, the pitch drive motor 33 may be coupled to the pitch drive gearbox 35 so that the pitch drive motor 33 imparts mechanical force to the pitch drive gearbox 35. Similarly, the pitch drive gearbox 35 may be coupled to the pitch drive pinion 37 for rotation therewith. The pitch drive pinion 37 may, in turn, be in rotational engagement with a pitch bearing 54 coupled between the hub 20 and a corresponding rotor blade 22 such that rotation of the pitch drive pinion 37 causes rotation of the pitch bearing 54. Thus, in such embodiments, rotation of the pitch drive motor 33 drives the pitch drive gearbox 35 and the pitch drive pinion 37, thereby rotating the pitch bearing 54 and the rotor blade 22 about the pitch axis 34.

As such, the turbine controller 26 may be communicatively coupled to each pitch adjustment mechanism 32 of the wind turbine 10 (one of which is shown) through a pitch controller 30 for controlling and/or altering the pitch angle of the rotor blades 22 (i.e., an angle that determines a perspective of the rotor blades 22 with respect to the direction 28 of the wind). For instance, the turbine controller 26 and/or the pitch controller 30 may be configured to transmit a control signal/command to each pitch adjustment mechanism 32 such that the pitch adjustment mechanism(s) 32 adjusts the pitch angle of the rotor blades 22 as described herein. The turbine controller 26 may control the pitch angle of the rotor blades 22, either individually or simultaneously, by transmitting suitable control signals/commands to a pitch controller of the wind turbine 10, which may be configured to control the operation of a plurality of pitch drives or pitch adjustment mechanisms 32 of the wind turbine, or by directly controlling the operation of the plurality of pitch drives or pitch adjustment mechanisms.

Figure 3:
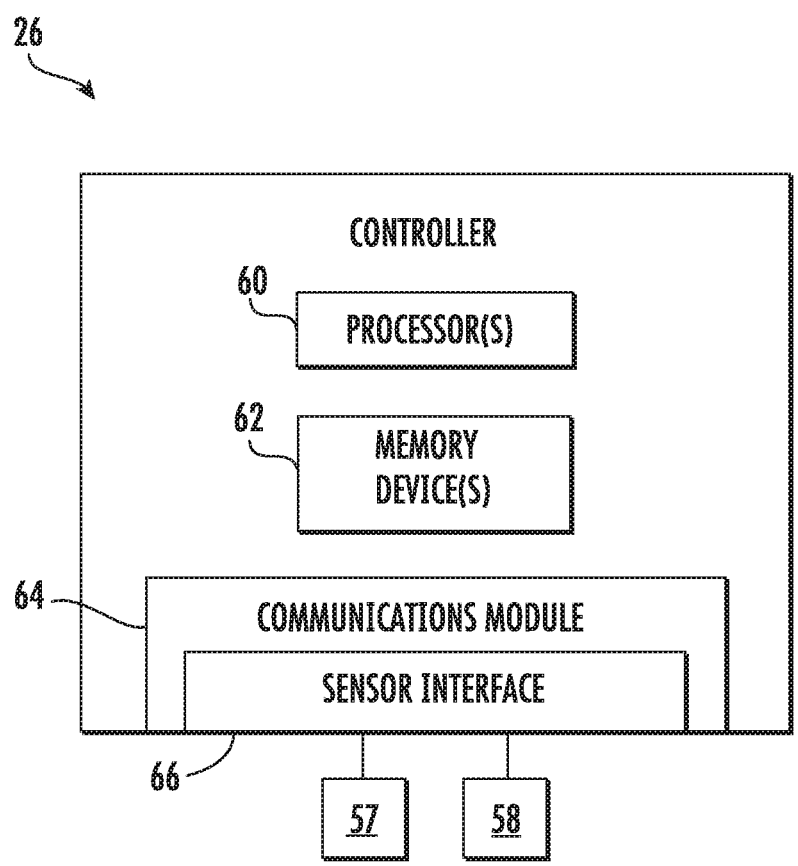
FIG. 3 illustrates a schematic diagram of one embodiment of suitable components that may be included in a wind turbine controller according to the present disclosure.

Referring now to FIG. 3, there is illustrated a block diagram of one embodiment of suitable components that may be included within the controller 26 according to the present disclosure. As shown, the controller 26 may include one or more processor(s) 60 and associated memory device(s) 62 configured to perform a variety of computer-implemented functions (e.g., performing the methods, steps, calculations and the like and storing relevant data as disclosed herein). Additionally, the controller 26 may also include a communications module 64 to facilitate communications between the controller 26 and the various components of the wind turbine 10. Further, the communications module 64 may include a sensor interface 66 (e.g., one or more analog-to-digital converters) to permit signals transmitted from one or more sensors 57, 58 to be converted into signals that can be understood and processed by the processors 60. It should be appreciated that the sensors 57, 58 may be communicatively coupled to the communications module 64 using any suitable means. For example, as shown in FIG. 3, the sensors 57, 58 are coupled to the sensor interface 66 via a wired connection. However, in other embodiments, the sensors 57, 58 may be coupled to the sensor interface 66 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 62 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 62 may generally be configured to store suitable computer-readable instructions that, when implemented by the processor(s) 60, configure the controller 26 to perform various functions including, but not limited to, transmitting suitable control signals to implement corrective action(s) in response to a distance signal exceeding a predetermined threshold as described herein, as well as various other suitable computer-implemented functions.

As discussed above, a wind turbine 10, such as the nacelle 16 thereof, may rotate about the yaw axis 36 as required. In particular, rotation about the yaw axis 36 may occur due to changes in the wind direction 28, such that the rotor 18 is aligned with the wind direction 28. For example, when the wind turbine 10 is in an idling state, the controller 26 actively tracks the wind direction to provide better alignment to the wind and minimize start-up delays when the wind speed increases or decreases back into the operating range. However, in a situation where the wind turbine 10 is in an idling or parked stated and one or more of the rotor blades 22 becomes stuck, there are limited benefits to tracking the wind because repair will be required before restarting the wind turbine 10. Thus, in such situations, the turbine controller 26 is configured to implement a control strategy to reduce the drag force on the faulted rotor blade so as to reduce loads thereon and/or to prevent rotor imbalance.

Figure 4:
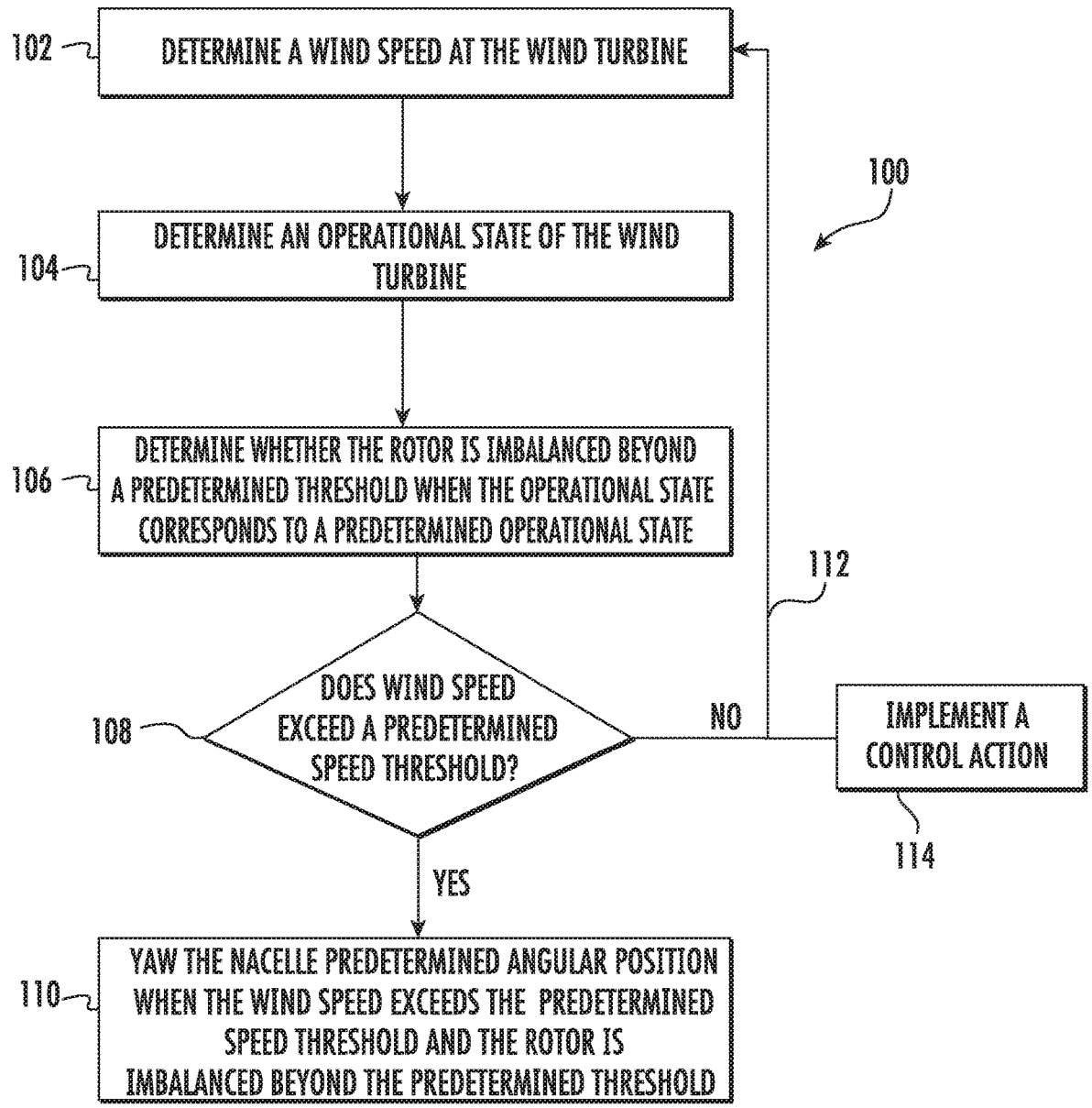
FIG. 4 illustrates a flow diagram of one embodiment of a method for reducing loads of a wind turbine according to the present disclosure.

More specifically, as shown in FIG. 4, a flow diagram of one embodiment of a method 100 for reducing loads of the wind turbine 10 in situations where the wind turbine 10 is in an idling or parked state and one or more of the rotor blades 22 becomes stuck is illustrated. In general, the method 100 will be described herein with reference to the wind turbine 10 shown in FIGS. 1 and 2, as well as the various controller components shown in FIG. 3. However, it should be appreciated that the disclosed method 100 may be implemented with wind turbines having any other suitable configurations and/or within systems having any other suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at 102, the method 100 may optionally include determining a wind speed at the wind turbine 10. For example, in one embodiment, the controller 26 may determine the wind speed by receiving sensor signals from one or more wind sensors at the wind turbine 10, e.g. via the wind sensor 58. The controller 26 may then determine the wind speed as a function of the sensor signals.

Still referring to FIG. 4, as shown at 104, the method 100 may include determining an operational state of the wind turbine 10. For example, in one embodiment, the predetermined operational state of the wind turbine 10 may include an idling state, a parked state, a shutdown state, and/or a maintenance state. As used herein, the "shutdown state" of the wind turbine 10 generally refers to the operational state where the generator 24 of the wind turbine 10 is shutdown. As used herein, the "idling state" of the wind turbine 10 generally refers to the operational state where, due to lack of wind or some other operational conditions (e.g. faults), the rotatable hub 20 of the wind turbine 10 is allowed to rotate (i.e. idle) at low rotational speeds, e.g. around 0.2 rpm, rather than being stopped completely. As such, the wind turbine 10 may be shut down, but may be allowed to idle. In contrast, a "parked state" of the wind turbine 10 generally refers to the operational state where the rotatable hub 20 is stopped and prevented from rotating, e.g. via braking. In addition, a "maintenance state" of the wind turbine 10 generally refers to operational state where the turbine is undergoing a maintenance procedure and the wind turbine 10 is shut down.

Thus, as shown at 106, the method 100 may include determining whether the rotor 18 is imbalanced beyond a predetermined threshold when the operational state corresponds to a predetermined operational state, e.g. when the wind turbine is idling. Since some level of imbalance may exist in the rotor 18, the method 100 evaluates the rotor imbalance with respect to the predetermined threshold to ensure the imbalance is of a certain magnitude before moving forward. The controller 26 is configured to determine the rotor imbalance using a variety of methods. For example, in one embodiment, the controller 26 may pitch each of the plurality of rotor blades 22 of the wind turbine 10 simultaneously towards power to speed up a rotor speed of the rotor 18 and determine whether the rotor 18 is imbalanced beyond a predetermined threshold based on the pitching. For example, if one or more of the blades 22 does not pitch towards power, the controller 26 can determine that such a rotor blade 22 is stuck, thereby causing a rotor imbalance. In alternative embodiments, rather than actively pitching the rotor blades 22, the controller 26 may allow the rotor 18 to rotate passively and determine whether the rotor 18 is imbalanced beyond the predetermined threshold based on the passive rotation.

In still another embodiment, the controller 26 may receive one or more sensor measurements from one or more sensors that are indicative of a rotor imbalance. In such embodiments, the controller 26 may determine whether the rotor is imbalanced beyond the predetermined threshold based on the sensor measurement(s), e.g. by inputting the sensor measurements into a computer model and calculating the rotor imbalance via one or more algorithms. The various sensors described herein may include any suitable sensor, such as a proximity sensor, an inductive sensor, a strain gauge, a radio sensor, a laser sensor, a deflection measuring sensor, a Miniature Inertial Measurement Unit (MIMU), a pressure sensor, a load sensor, an accelerometer, a Sonic Detection and Ranging (SODAR) sensor, a Light Detection and Ranging (LIDAR) sensor, an optical sensor, or similar, or combinations thereof.

Referring still to FIG. 4, as shown at 108, the method 100 may include determining whether the wind speed exceeds a predetermined speed threshold. The predetermined speed threshold may be set to any wind speed value. For example, in one embodiment, the predetermined speed threshold may include wind speeds above a cut-out wind speed. If the wind speed exceeds the predetermined speed threshold, as shown at 110, the method 100 includes yawing the nacelle 16 to a predetermined angular position (e.g. a predetermined loads benign yawing/azimuth position) when the wind speed exceeds a predetermined speed threshold and the rotor 18 is imbalanced. In additional embodiments, the method 100 may include scheduling a maintenance action after yawing the nacelle 16. For example, in certain embodiments, the maintenance action may include scheduling an inspection and/or repair of the stuck blade 22.

In one embodiment, e.g. during the idling state, the controller 26 may be configured to automatically yaw the nacelle 16. In alternative embodiments, e.g. during the maintenance state, a user can manually select to yaw the nacelle 16. Accordingly, yawing the nacelle 16 provides substantial loads reduction. In further embodiments, as shown at 112, the method 100 may include continuously monitoring the wind speed and/or the incoming wind direction. As such, if the wind speed does not exceed the predetermined speed threshold, as shown at 114, the method 100 may also include implementing or triggering a control action (or corrective action). For example, the method 100 may include pitching one or more of the rotor blades 22, modifying the generator speed, derating the wind turbine 10, uprating the wind turbine 10, modifying a torque of the wind turbine 10, etc. If the wind turbine 100 resumes normal operation, the controller 26 may also be configured to yaw the nacelle 16 as long as the wind speed remains below the predetermined speed threshold.

Figure 5:
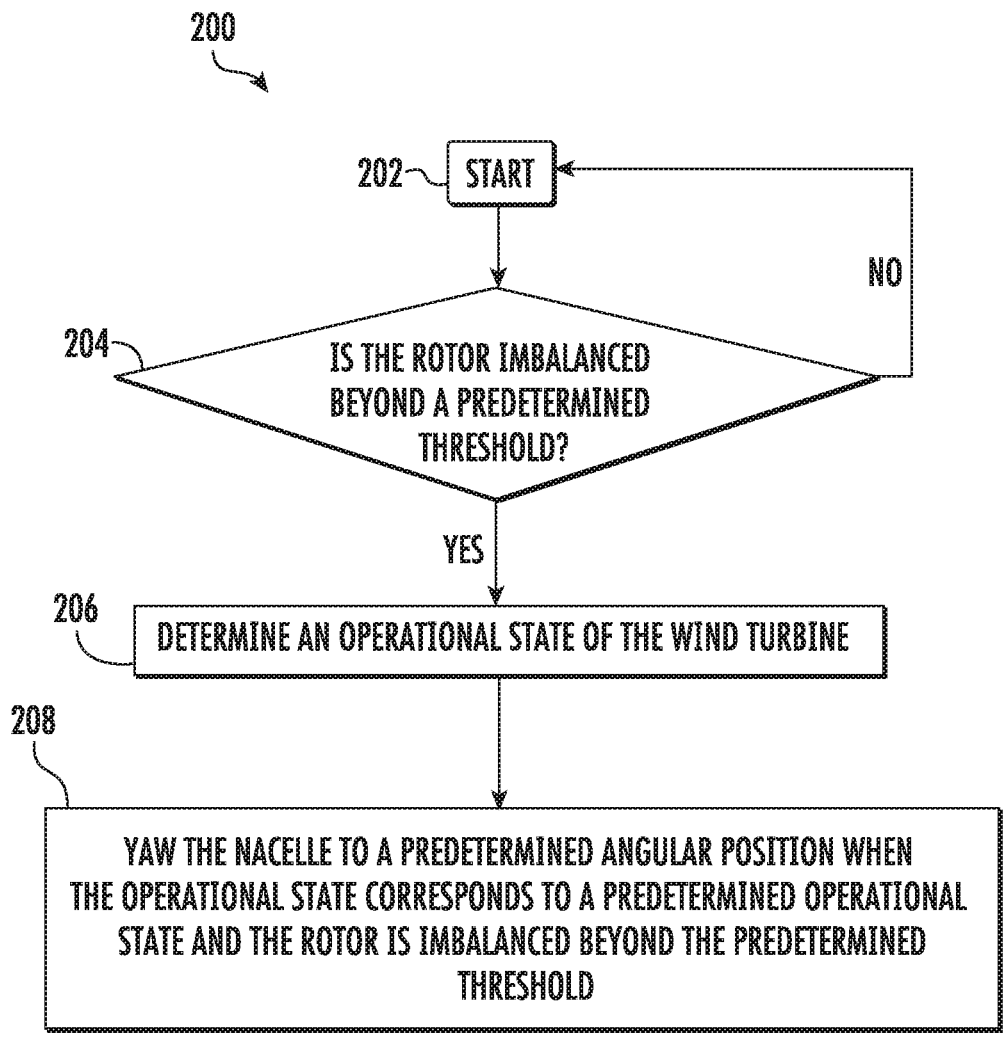
FIG. 5 illustrates a flow diagram of another embodiment of a method for reducing loads of a wind turbine according to the present disclosure.

Referring now to FIG. 5, a flow diagram of another embodiment of a method 200 for reducing loads of the wind turbine 10 is illustrated. More specifically, the method 200 is configured to reduce loads in situations where the wind turbine 10 has a stuck rotor blade 22 and causes a rotor imbalance (as detected in normal operation or a fault shutdown) and then changes to an idling or parked state. In general, the method 200 will be described herein with reference to the wind turbine 10 shown in FIGS. 1 and 2, as well as the various controller components shown in FIG. 3. However, it should be appreciated that the disclosed method 200 may be implemented with wind turbines having any other suitable configurations and/or within systems having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at 202, the control method 200 begins. As shown at 204, the method 200 may include determining whether the rotor 18 is imbalanced beyond a predetermined threshold (i.e. during normal operation or during a fault shutdown). If so, as shown at 206, the method 200 may include determining an operational state of the wind turbine 10. Further, as shown at 208, the method 200 may include yawing the nacelle 16 to a predetermined angular position when the operational state corresponds to a predetermined operational state (i.e. idling and/or maintenance or repair) and the rotor is imbalanced beyond the predetermined threshold.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for reducing loads of a wind turbine, the wind turbine having a nacelle mounted atop a tower and a rotor mounted to the nacelle, the rotor having a rotatable hub with a plurality of rotor blades mounted thereto, the method comprising:
    determining a wind speed at the wind turbine;
    determining an operational state of the wind turbine;
    pitching each of the plurality of rotor blades of the wind turbine towards power to speed up a rotor speed of the rotor or allowing the rotor to rotate passively;
    determining whether the rotor is imbalanced beyond a predetermined threshold when the operational state corresponds to a predetermined operational state based on one of the pitching or the passive rotation, wherein a rotor imbalance beyond the predetermined threshold is indicative of a pitch fault in one or more of the rotor blades; and,
    yawing the nacelle to a predetermined angular position when the wind speed exceeds a predetermined speed threshold and the rotor is imbalanced beyond the predetermined threshold.

2. The method of claim 1, wherein determining the wind speed at the wind turbine further comprises:
    receiving sensor signals from one or more wind sensors at the wind turbine; and,
    determining the wind speed as a function of the sensor signals.

3. The method of claim 1, wherein the predetermined operational state of the wind turbine comprises at least one of an idling state, a parked state, a shutdown state, a reduced operation state, or a maintenance state.

4. The method of claim 1, wherein determining whether the rotor is imbalanced beyond the predetermined threshold when the operational state corresponds to the predetermined operational state further comprises:
    receiving one or more sensor measurements from one or more sensors, the one or more sensor measurements indicative of a rotor imbalance; and,
    determining whether the rotor is imbalanced beyond the predetermined threshold based on one or more sensor measurements that are used as inputs to a computer model.

5. The method of claim 1, further comprising scheduling a maintenance action after yawing the nacelle to the predetermined angular position.

6. The method of claim 1, further comprising continuously monitoring the incoming wind direction and yaw the nacelle to the predetermined angular position if the wind speed is below the predetermined speed threshold.

7. The method of claim 1, further comprising automatically yawing the nacelle of the wind turbine.

8. The method of claim 1, further comprising manually yawing the nacelle of the wind turbine.

9. A system for reducing loads of a wind turbine, the wind turbine having a nacelle mounted atop a tower and a rotor mounted to the nacelle, the rotor having a rotatable hub with a plurality of rotor blades mounted thereto, the system comprising:
    a controller comprising at least one processor configured to perform one or more operations, the one or more operations comprising:
        pitching each of the plurality of rotor blades of the wind turbine towards power to speed up a rotor speed of the rotor or allowing the rotor to rotate passively;
        determining whether the rotor is imbalanced beyond a predetermined threshold based on one of the pitching or the passive rotation;
        if the rotor is imbalanced beyond the predetermined threshold, determining an operational state of the wind turbine; and,
        yawing the nacelle to a predetermined angular position when the operational state corresponds to a predetermined operational state and the rotor is imbalanced beyond the predetermined threshold.

10. The system of claim 9, further comprising at least one wind sensor communicatively coupled to the controller, the at least one wind sensor configured to generate sensor signals representative of at least one wind parameter at the wind turbine, the one or more operations further comprising determining a wind speed at the wind turbine based on the sensor signals.

11. The system of claim 10, wherein determining whether the rotor is imbalanced beyond the predetermined threshold when the operational state corresponds to the predetermined operational state further comprises:
    receiving one or more sensor measurements from one or more rotor sensors, the one or more sensor measurements indicative of a rotor imbalance; and,
    determining, via the controller, whether the rotor is imbalanced beyond the predetermined threshold based on one or more sensor measurements that are used as inputs to a computer model.

12. The system of claim 11, wherein the at least one wind sensor or the one or more rotor sensors comprises at least one of a proximity sensor, an inductive sensor, a strain gauge, a radio sensor, a laser sensor, a deflection measuring sensor, a Miniature Inertial Measurement Unit (MIMU), a pressure sensor, a load sensor, an accelerometer, a Sonic Detection and Ranging (SODAR) sensor, a Light Detection and Ranging (LIDAR) sensor, or an optical sensor.

13. The system of claim 9, wherein the predetermined operational state of the wind turbine comprises at least one of an idling state, a parked state, a shutdown state, a reduced operation state, or a maintenance state.

14. The system of claim 9, wherein the one or more operations further comprise scheduling, via the controller, a maintenance action after yawing the nacelle to the predetermined angular position.

15. The system of claim 9, wherein the one or more operations further comprise continuously monitoring the incoming wind direction and yaw the nacelle to the predetermined angular position if the wind speed is below the predetermined speed threshold.

16. A method for reducing loads of a wind turbine while the wind turbine is idling, the wind turbine having a nacelle mounted atop a tower and a rotor mounted to the nacelle, the rotor having a rotatable hub with a plurality of rotor blades mounted thereto, the method comprising:
   monitoring a wind speed at the wind turbine;
   pitching each of the plurality of rotor blades of the wind turbine towards power to speed up a rotor speed of the rotor or allowing the rotor to rotate passively;
   determining whether the rotor is imbalanced beyond a predetermined threshold based on one of the pitching or the passive rotation while the wind turbine is idling; and,
   yawing the nacelle to a predetermined angular position when the wind speed exceeds a predetermined speed threshold and the rotor is imbalanced beyond the predetermined threshold.

* * * * *